US012297083B2

(12) United States Patent
Ferrier

(10) Patent No.: US 12,297,083 B2
(45) Date of Patent: May 13, 2025

(54) ARTICULATED CLUTCH HAVING LIMITED COUPLER ROTATIONAL MOVEMENT

(71) Applicant: Illinois Tool Works Inc., Glenview, IL (US)

(72) Inventor: Ian Ross Ferrier, Wantirna South (AU)

(73) Assignee: Illinois Tool Works Inc., Glenview, IL (US)

( * ) Notice: Subject to any disclaimer, the term of this patent is extended or adjusted under 35 U.S.C. 154(b) by 273 days.

(21) Appl. No.: 17/863,910

(22) Filed: Jul. 13, 2022

(65) Prior Publication Data

US 2023/0016603 A1 Jan. 19, 2023

(30) Foreign Application Priority Data

Jul. 14, 2021 (AU) ................................ 2021205058
Jun. 28, 2022 (AU) ................................ 2022204593

(51) Int. Cl.
*B66C 1/66* (2006.01)

(52) U.S. Cl.
CPC .................................... *B66C 1/666* (2013.01)

(58) Field of Classification Search
CPC .. B66C 1/66; B66C 1/36; B66C 1/666; B60D 1/247; B60D 1/36
USPC ............................................... 294/215, 82.23
See application file for complete search history.

(56) References Cited

U.S. PATENT DOCUMENTS 474,885 A 5/1892 Viett
821,952 A 5/1906 Murphy
2,369,344 A 2/1945 Ehmann
2,563,164 A 8/1951 Fletcher
2,719,747 A 10/1955 Layne
3,134,221 A * 5/1964 Bergman ................ F16G 15/02 59/88
3,241,309 A 3/1966 Mason
3,297,293 A 1/1967 Andrews
3,333,388 A 8/1967 Sandin
3,373,560 A * 3/1968 Manney .................. F16G 15/02 59/85
3,404,503 A 10/1968 Courtois
3,431,012 A 3/1969 Eriksson
3,453,822 A 7/1969 Crook
3,456,547 A 7/1969 Strong
RE27,620 E 4/1973 Crook, Jr.
3,828,550 A * 8/1974 Fink ........................ F16G 15/04 59/85
3,846,978 A * 11/1974 Schreyer ................ F16G 15/02 59/85
3,899,873 A * 8/1975 Fink ........................ F16G 15/02 59/85
4,017,115 A 4/1977 Holt et al.
(Continued)

FOREIGN PATENT DOCUMENTS

AU 755585 11/1999
AU 2002320664 4/2003
(Continued)

*Primary Examiner* — Paul T Chin
(74) *Attorney, Agent, or Firm* — Neal, Gerber & Eisenberg LLP

(57) ABSTRACT

A clutch for lifting a concrete component and including a toroidal connector, a latch movable relative to the toroidal connector from a disengaged condition to an engaged condition, and a coupler for coupling the toroidal connector to a lifting apparatus, wherein the coupler is articulated.

19 Claims, 15 Drawing Sheets

(56) References Cited

U.S. PATENT DOCUMENTS

| | | | | |
|---|---|---|---|---|
| 4,018,470 | A | 4/1977 | Tye | |
| 4,068,879 | A | 1/1978 | Torbet | |
| 4,079,983 | A | 3/1978 | Van Mastrigt | |
| 4,088,361 | A | 5/1978 | Ditcher | |
| 4,094,141 | A | 6/1978 | Rehbein | |
| 4,106,284 | A | 8/1978 | Crook | |
| 4,107,917 | A | 8/1978 | Fink | |
| 4,173,856 | A | 11/1979 | Fricker | |
| 4,179,151 | A | 12/1979 | Tye | |
| 4,179,878 | A | 12/1979 | Albertini | |
| 4,325,575 | A | 4/1982 | Holt et al. | |
| RE31,131 | E | 1/1983 | Torbet | |
| 4,367,892 | A | 1/1983 | Holt | |
| 4,437,642 | A | 3/1984 | Holt | |
| 4,512,121 | A | 4/1985 | Carydias | |
| 4,525,994 | A * | 7/1985 | Alt | F16G 15/04 403/155 |
| 4,570,987 | A | 2/1986 | Wong | |
| 4,627,198 | A | 12/1986 | Francies | |
| 4,634,164 | A * | 1/1987 | Fricker | B66C 1/666 52/125.5 |
| 4,671,721 | A | 6/1987 | Pratt et al. | |
| 4,703,595 | A * | 11/1987 | Zipf | E04G 21/142 52/125.4 |
| 4,726,561 | A | 2/1988 | Worzala, Jr. | |
| 4,785,593 | A | 11/1988 | Munoz, Jr. | |
| 4,936,612 | A | 6/1990 | Kohn | |
| 4,996,804 | A | 3/1991 | Naka et al. | |
| 5,244,243 | A * | 9/1993 | Grayson | B66C 1/666 294/82.35 |
| 5,248,176 | A | 9/1993 | Fredriksson | |
| 5,261,198 | A | 11/1993 | McMillan | |
| 5,732,991 | A | 3/1998 | Tsui | |
| 6,142,546 | A | 11/2000 | Hansort | |
| 6,254,300 | B1 * | 7/2001 | Crow | F16G 15/02 403/155 |
| 6,336,766 | B1 | 1/2002 | De Villele | |
| 6,568,730 | B1 | 5/2003 | Paterson | |
| 6,652,012 | B1 | 11/2003 | Fuller et al. | |
| 6,694,680 | B2 | 2/2004 | Zambelli et al. | |
| 6,792,734 | B2 | 9/2004 | Zambelli et al. | |
| 7,213,795 | B2 | 5/2007 | Paterson | |
| 7,562,919 | B2 * | 7/2009 | Lawley | E04G 15/04 294/215 |
| 7,905,063 | B2 | 3/2011 | Kelly | |
| 8,172,289 | B2 | 5/2012 | MacKay | |
| 8,230,931 | B2 | 7/2012 | Rodriguez et al. | |
| 8,381,363 | B2 | 2/2013 | Boeckman et al. | |
| 8,640,399 | B2 | 2/2014 | Fradera Pellicer | |
| 8,708,595 | B2 | 4/2014 | Tseng | |
| 8,757,693 | B2 | 6/2014 | Fuller et al. | |
| 8,875,471 | B2 | 11/2014 | Siqueiros | |
| 8,943,777 | B2 | 2/2015 | Espinosa | |
| 8,959,847 | B2 | 2/2015 | Recker et al. | |
| 8,966,833 | B2 | 3/2015 | Ally | |
| 8,966,874 | B2 | 3/2015 | Moreau et al. | |
| 9,038,360 | B1 | 5/2015 | Moreau et al. | |
| 9,169,900 | B1 | 10/2015 | Moreau et al. | |
| 9,222,251 | B2 | 12/2015 | Espinosa | |
| 9,347,232 | B1 | 5/2016 | Francies, III | |
| RE46,831 | E | 5/2018 | Francies, III | |
| 10,576,868 | B1 | 3/2020 | Gilmour | |
| 10,724,559 | B2 | 7/2020 | Heaphy et al. | |
| 11,167,957 | B1 | 11/2021 | Striebel et al. | |
| 11,180,345 | B2 | 11/2021 | Connell et al. | |
| 11,369,816 | B2 * | 6/2022 | Carrasca | A62B 35/0037 |
| 11,401,686 | B2 | 8/2022 | Grewell et al. | |
| 11,585,069 | B2 | 2/2023 | Stolz | |
| 2005/0183349 | A1 | 8/2005 | Hansort | |
| 2006/0248814 | A1 | 11/2006 | Chen et al. | |
| 2011/0041449 | A1 | 2/2011 | Espinosa | |
| 2014/0026515 | A1 | 1/2014 | Espinosa | |
| 2014/0053475 | A1 | 2/2014 | Baltazar | |
| 2015/0096242 | A1 | 4/2015 | Lin | |
| 2015/0167260 | A1 | 6/2015 | Siqueiros | |
| 2015/0284967 | A1 | 10/2015 | Kim | |
| 2016/0049057 | A1 | 2/2016 | Bobbitt et al. | |
| 2017/0145684 | A1 | 5/2017 | Merrick | |
| 2017/0226702 | A1 | 8/2017 | Connell et al. | |
| 2018/0187436 | A1 | 7/2018 | Mackay Sim | |
| 2019/0242113 | A1 | 8/2019 | Reuter | |
| 2021/0107773 | A1 | 4/2021 | Wang | |
| 2023/0013345 | A1 * | 1/2023 | Ferrier | B66C 1/666 |
| 2023/0018288 | A1 * | 1/2023 | Ferrier | B66C 1/666 |
| 2023/0021585 | A1 * | 1/2023 | Ferrier | B66C 1/666 |

FOREIGN PATENT DOCUMENTS

| | | | |
|---|---|---|---|
| AU | 2019279923 | A1 | 6/2020 |
| CN | 208037866 | U | 11/2018 |
| DE | 7244545 | | 5/1973 |
| DE | 2264431 | | 4/1974 |
| DE | 2906616 | A1 | 8/1980 |
| DE | 229671 | A1 | 11/1985 |
| DE | 3731061 | A1 | 4/1989 |
| DE | 202004002553 | U1 | 3/2005 |
| DE | 102009004266 | A1 | 7/2010 |
| DE | 10 2010 019833 | | 11/2011 |
| EP | 0 565 429 | | 10/1993 |
| EP | 0565429 | A1 | 10/1993 |
| EP | 0678472 | A2 | 10/1995 |
| EP | 1 115 642 | | 7/2001 |
| EP | 1 217 147 | | 6/2002 |
| EP | 3 056 634 | | 8/2016 |
| EP | 3056634 | A1 | 8/2016 |
| FR | 2651521 | A1 | 3/1991 |
| GB | 1162476 | | 8/1969 |
| GB | 2101264 | A | 1/1983 |
| GB | 2139278 | | 11/1984 |
| JP | 2003112884 | | 4/2003 |
| NZ | 232792 | A | 8/1993 |
| WO | 0249953 | A1 | 6/2002 |
| WO | WO 2014/025760 | | 2/2014 |
| WO | WO 2014/031365 | | 2/2014 |
| WO | WO 2014/185911 | | 11/2014 |
| WO | WO 2016/032718 | | 3/2016 |

* cited by examiner

Section A-A

Section A-A

Detail B

ARTICULATED CLUTCH HAVING LIMITED COUPLER ROTATIONAL MOVEMENT

PRIORITY CLAIM

The present application claims priority to and the benefit of Australian Patent Application No. 2021205058, filed Jul. 14, 2021 and Australian Patent Application No. 2022204593, filed Jun. 28, 2022, the entire contents of each of which are incorporated herein by reference.

CROSS-REFERENCE TO RELATED APPLICATIONS

This application is related to the following commonly owned co-pending patent applications: U.S. application Ser. No. 17/864,554, entitled "CLUTCH HAVING LIMITED ARTICULATION,"; U.S. application Ser. No. 17/863,937, entitled "CLUTCH HAVING TAMPER EVIDENT INDICATOR,"; and U.S. application Ser. No. 17/864,543, entitled "CLUTCH HAVING ABUTMENT SURFACES,".

FIELD

This present disclosure relates to a clutch. More particularly, but not exclusively, the present disclosure relates to an articulated clutch for lifting a concrete component by way of an anchor cast into the concrete component.

BACKGROUND

It is known to provide a clutch for lifting concrete components where the clutch is used to lift, for example, concrete panels after casting by way of a cast-in edge-lift anchor and for moving them to curing racks and later onto trucks for transportation to a construction site. However, the applicant has identified that there are disadvantages with existing lifting clutches.

The applicant has determined that it would be beneficial for there to be provided a clutch which overcomes or at least alleviates one or more disadvantages of existing clutches. Accordingly, examples of the present disclosure seek to avoid or at least ameliorate the disadvantages of existing clutches.

SUMMARY

In accordance with one aspect of the present disclosure, there is provided a clutch for lifting a concrete component, including a toroidal connector, a latch movable relative to the toroidal connector between a disengaged condition and an engaged condition, and a coupler for coupling the toroidal connector to a lifting apparatus, wherein the coupler is articulated.

Preferably, the coupler includes a first part and a second part pivotal relative to the first part, the first part forming a first loop engaged through the toroidal connector and the second part forming a second loop for receiving the lifting apparatus.

Preferably, the first loop is a different size to the second loop. More preferably, the first loop is smaller than the second loop.

In a preferred form, the second loop is adapted to allow direct fitment of a lifting chain while also allowing direct fitment of a lifting hook.

It is preferred that the coupler includes an elongated pin about a longitudinal axis of which the second part is pivotal relative to the first part.

Preferably, the latch is in the form of a circular latch passing through an inner circular passage of the toroidal connector.

In accordance with another aspect of the present disclosure, there is provided a clutch for lifting a concrete component, including a toroidal connector, a latch movable relative to the toroidal connector between a disengaged condition and an engaged condition, and a coupler for coupling the toroidal connector to a lifting apparatus, wherein the coupler includes a first part and a second part pivotal relative to the first part about a pin, the first part having a first circular arc and the second part having a second circular arc, and wherein the pin is located such that a longitudinal axis of the pin is perpendicular to a line connecting a centre of the first arc to a centre of the second arc.

There is also disclosed a clutch for lifting a concrete component, including a toroidal connector, a latch in the form of a locking ring movable relative to the toroidal connector between a disengaged condition and an engaged condition, the locking ring having a handle extending radially outwardly from the toroidal connector, and a coupler for coupling the toroidal connector to a lifting apparatus, wherein the coupler includes a first part and a second part pivotal relative to the first part, the coupler being arranged to limit pivotal movement of the second part relative to the first part.

Preferably, the coupler is arranged to limit pivotal movement of the second part relative to the first part in one direction. More preferably, the coupler is arranged to limit pivotal movement of the second part relative to the first part such that said limit prevents a tip of the locking ring handle passing through an inner loop of the second part.

In a preferred form, the first part includes a shoulder arranged to bear against the second part at said limit.

The second part may include a shoulder arranged to bear against the first part at said limit.

Preferably, the coupler is arranged to limit pivotal movement of the second part relative to the first part such that said limit prevents the second part from engaging with the locking ring handle to rotate the locking ring handle. More preferably, the coupler is arranged to limit pivotal movement of the second part relative to the first part such that said limit prevents the second part from engaging with the locking ring handle to rotate the locking ring handle from the engaged condition to the disengaged condition.

There is also disclosed a clutch for lifting a concrete component, including a toroidal connector, a latch movable relative to the toroidal connector between a disengaged condition and an engaged condition, and a coupler for coupling the toroidal connector to a lifting apparatus, wherein the coupler includes a first part and a second part pivotal relative to the first part about a pin, and wherein the coupler includes a tamper evident indicator to indicate that the clutch has not been disassembled.

Preferably, the tamper evident indicator is arranged to indicate that the pin has not been removed from the coupler.

In a preferred form, the coupler is provided with a bush around a central portion of the pin. More preferably, the pin has a circular groove about its circumference and the tamper evident indicator includes a member in engagement with the circular groove to prevent movement of the pin along its longitudinal axis relative to the bush.

More preferably, the member is anchored to the bush.

In one form, the member is in the form of a rivet.

Alternatively, the member is in the form of a roll pin.

There is also disclosed a clutch for lifting a concrete component, including a toroidal connector, a latch movable relative to the toroidal connector between a disengaged condition and an engaged condition, and a coupler for coupling the toroidal connector to a lifting apparatus, wherein the toroidal connector has a circular seat for sitting upon a circular upper surface of a head of and anchor coupled to the toroidal connector, wherein the circular seat terminates in a radial bearing surface for abutment with a castellation of the anchor.

Preferably, the circular seat has a first radial bearing surface for abutment with a first castellation of the anchor and a second, opposite, radial bearing surface for abutment with a second castellation of the anchor.

In a preferred form, the circular seat is circular about an arc having a centre at a central longitudinal axis of the latch. More preferably, the radial bearing surface is radial relative to a circle having a centre at the central longitudinal axis of the latch.

There is also disclosed a clutch for lifting a concrete component, including a toroidal connector, a latch in the form of a locking ring movable relative to the toroidal connector between a disengaged condition and an engaged condition, the locking ring having a handle extending radially outwardly from the toroidal connector, and a coupler for coupling the toroidal connector to a lifting apparatus, wherein the locking ring handle is arranged to abut the coupler to limit rotational movement of the coupler relative to the toroidal connector.

Preferably, the locking ring handle is arranged to limit rotational movement of the coupler relative to the toroidal connector such that said limit prevents a tip of the locking ring handle passing through an inner loop of the coupler.

Preferably, the coupler is arranged to limit pivotal movement of the second part relative to the first part in two directions.

Preferably, the first part is connected to the second part by a pivotal coupling. More preferably, the pivotal coupling includes a first hinge at one side of the coupler and a second hinge at an opposite side of the coupler. Even more preferably, the first hinge and the second hinge are arranged to provide pivotal movement along a common axis.

In a preferred form, the coupler includes a bush between the first hinge and the second hinge. More preferably, the bush includes a stop for abutting against the first part or the second part to limit rotation of the second part relative to the first part. Even more preferably, the bush is arranged to rotate with the second part and the stop is adapted to abut against the first part to limit rotation of the second part relative to the first part.

Preferably, the first part is provided with a tab for abutment with the stop. More preferably, the stop is in the form of a cutout having two stop surfaces, comprising a first stop surface for abutting one side of the tab and a second stop surface for abutting an opposite side of the tab for limiting rotation of the second part relative to the first part in two directions.

BRIEF DESCRIPTION OF THE DRAWINGS

The present disclosure is further described by way of non-limiting example only with reference to the accompanying drawings, in which.

DETAILED DESCRIPTION

Figure 2:
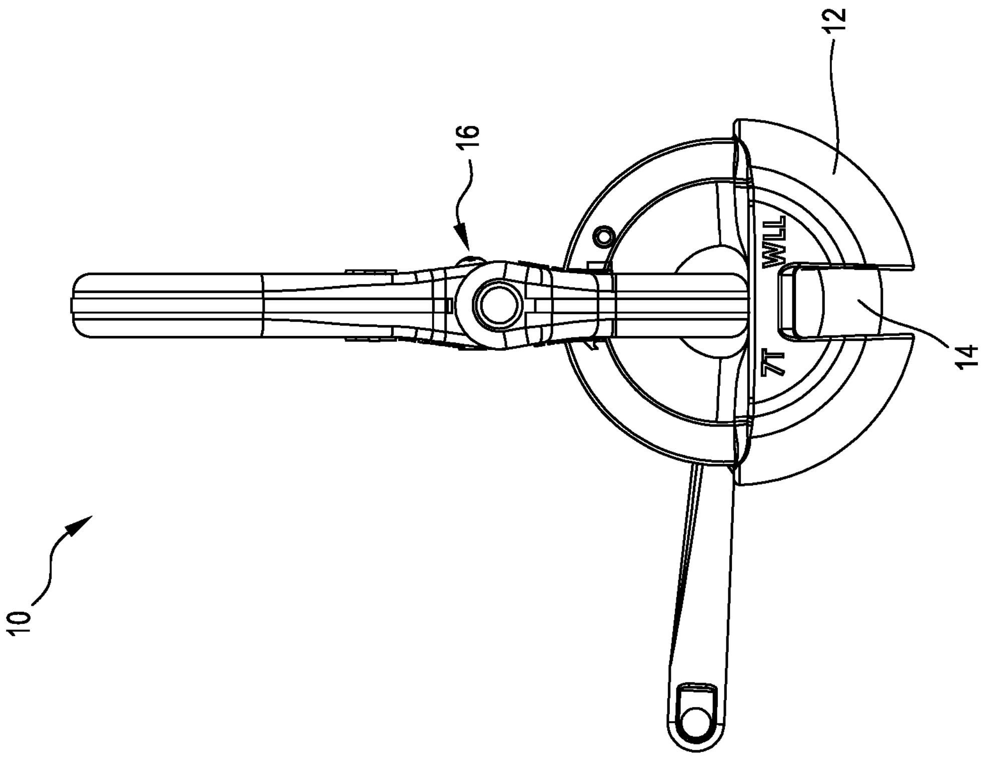
FIG. 2 shows a side view of the articulated clutch.
Figure 1:
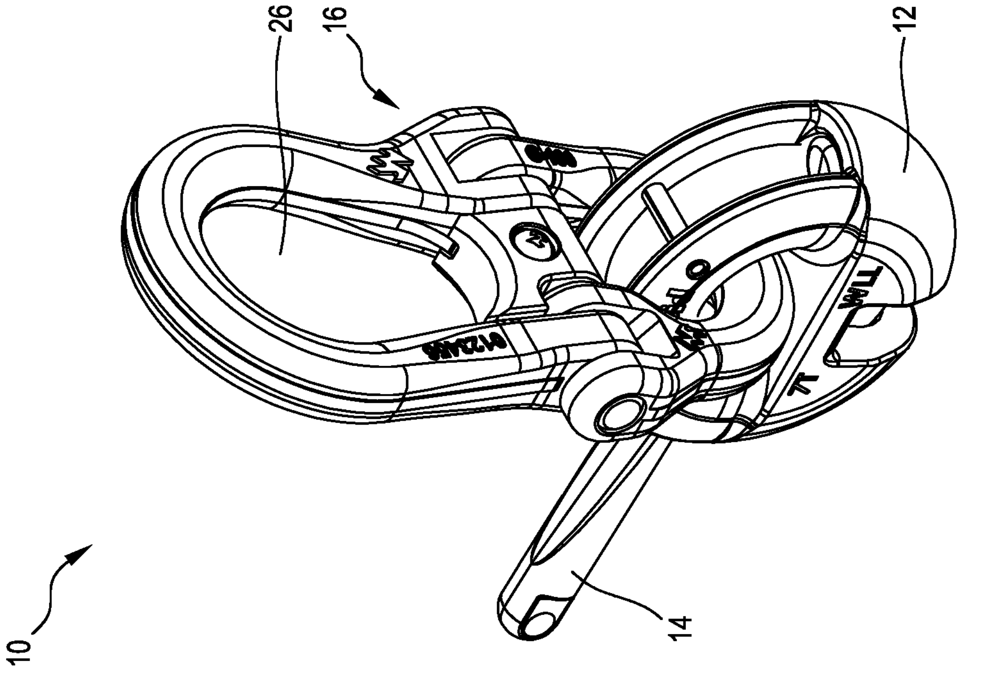
FIG. 1 shows a perspective view of an articulated clutch for lifting a concrete component in accordance with an example of the present disclosure.

As can be seen in FIGS. 1 to 18 of the drawings, the present disclosure may provide an articulated clutch for lifting a concrete component. Advantageously, the articulated clutch has a coupler including a first part and a second part pivotal relative to the first part. The first part forms a first loop and the second part forms a second loop. The two loops are dissimilar in size such that the top loop (when lifting) provided by the second loop will accept a crane or lifting hook but can still accept a suitable size chain fitted directly to the top loop.

More specifically, as shown in FIGS. 1 to 4, there is provided a clutch 10 for lifting a concrete component (not shown). The concrete component may take several forms including, but not limited to, a concrete panel. The concrete component may have a cast in edge lift anchor (for example), the anchor having an eye which is used for connection to a toroidal connector of the clutch 10 for lifting the concrete panel.

The clutch 10 includes a toroidal connector 12 and a latch 14. The latch 14 is movable relative to the toroidal connector 12 between a disengaged condition (in which the latch 14 is retracted into a toroidal sleeve of the toroidal connector 12) and an engaged condition (see FIG. 2) in which the latch 14 spans a gap of the toroidal connector 12 for engagement with an eye of and anchor cast into a concrete component. The clutch 10 also includes a coupler 16 for coupling the toroidal connector 12 to a lifting apparatus 18, wherein the coupler 16 is articulated.

The coupler 16 includes a first part 20 and a second part 22 pivotal relative to the first part, the first part forming a first loop 24 engaged through the toroidal connector 12 and the second part 22 forming a second loop 26 for receiving the lifting apparatus 18.

Figure 5:
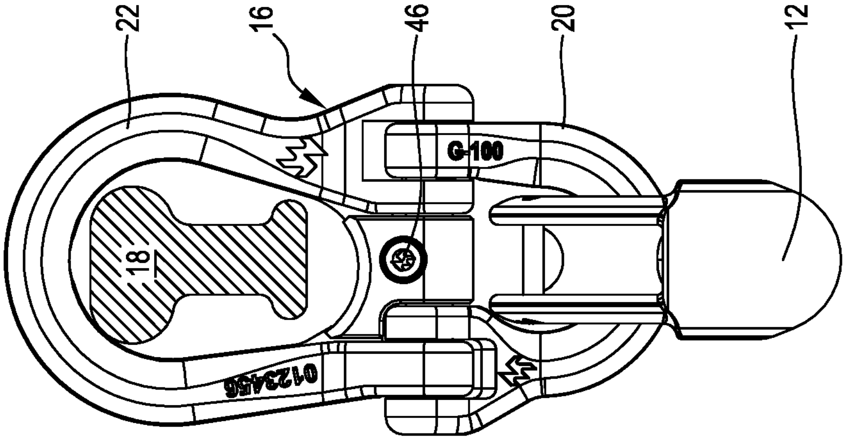
FIG. 5 shows a front view of the articulated clutch, depicting a tamper evident device incorporated into the clutch.

As shown, the first loop 24 is a different size to the second loop 26. More specifically, the first loop 24 is smaller than the second loop 26. The second loop 26 is adapted to allow direct fitment of a lifting chain while also allowing direct fitment of a lifting hook. Accordingly, the coupler 16 allows the direct fitment of a suitable size chain like a hammerlock but also allows for direct fitment to a lifting hook as shown in FIG. 5.

The articulation of this format of clutch handle (in the form of coupler 16) addresses the issue of welded handles getting bent around the head of a concrete panel as the panel is lifted off a truck at a building site, as the concrete panel is lifted and then rotated 90° before being positioned. It does this while also meeting the needs of the precast factory where the clutch 10 is used to lift concrete panels from horizontal to vertical after casting and for moving them to curing racks and later onto trucks for transportation to a building site.

The compact size of the two loops (the first loop 24 and the second loop 26) also allows for greater head height within the factory, allowing for a gain in lifting height. This in turn allows for increased panel sizes as well as increased maneuverability within the factory, where lifting height is limited by the gantry height.

Figure 4:
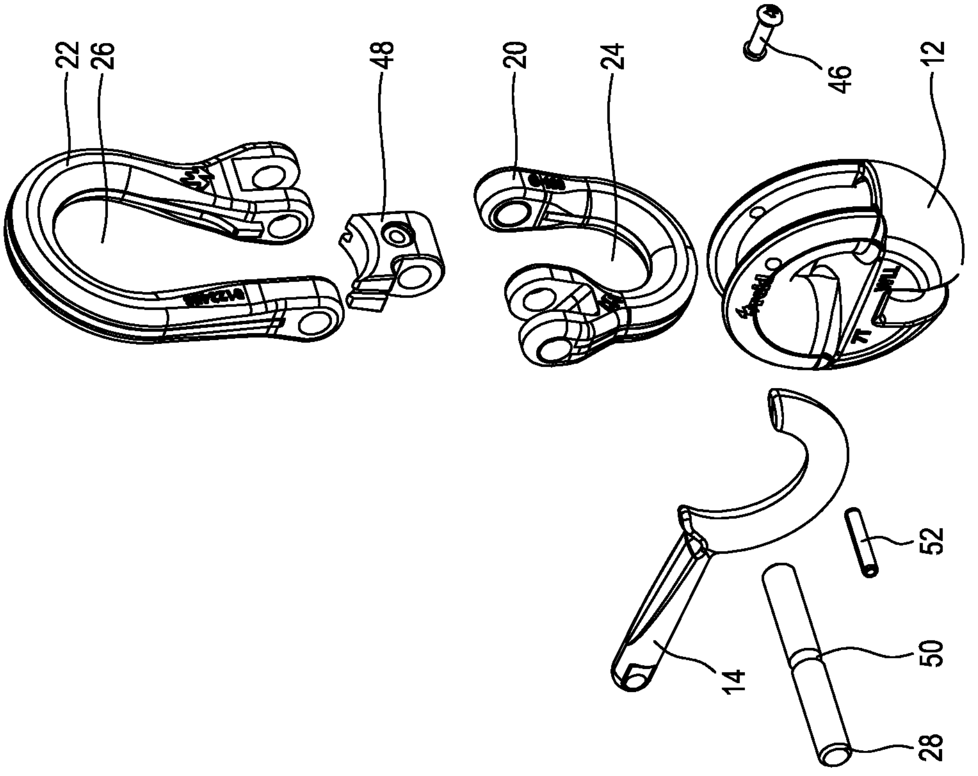
FIG. 4 shows an exploded view of the articulated clutch.
Figure 3:
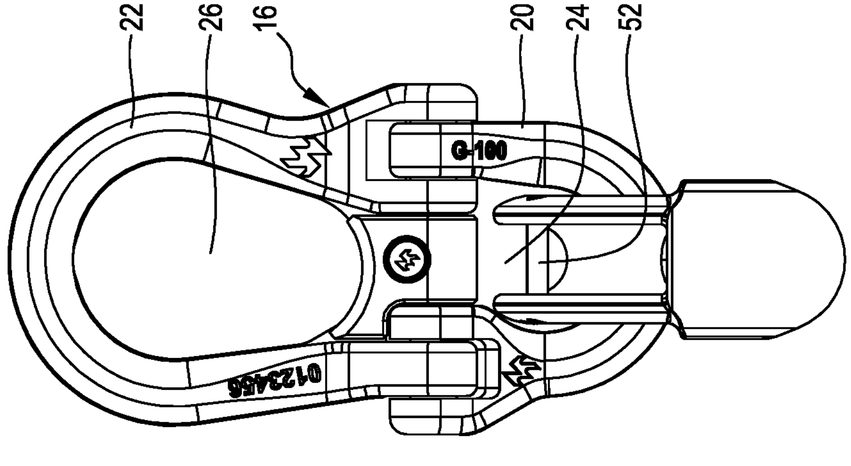
FIG. 3 shows a front view of the articulated clutch.

As shown in FIG. 4, the coupler 16 includes an elongated axle pin 28 about a longitudinal axis of which the second part 22 is pivotal relative to the first part 20. The first part 20 includes a forked end and a non-forked end. The forked end of the first part 20 engages with a non-forked end of the second part 22, whereas the non-forked end of the first part 20 engages with a forked end of the second part 22. The ends of the first part 20 and the second part 22 are provided with apertures through which the axle pin 28 is passed so as to hold together in pivotal relationship the first part 20 and the second part 22.

With reference to FIG. 4, the latch 14 is in the form of a circular latch passing through an inner circular passage of the toroidal connector 12. The latch 14 has a handle 30 for moving the latch 14 between the disengaged condition and the engaged condition, the handle 30 extending generally radially outwardly relative to a centre of the toroidal connector 12.

Figure 14:
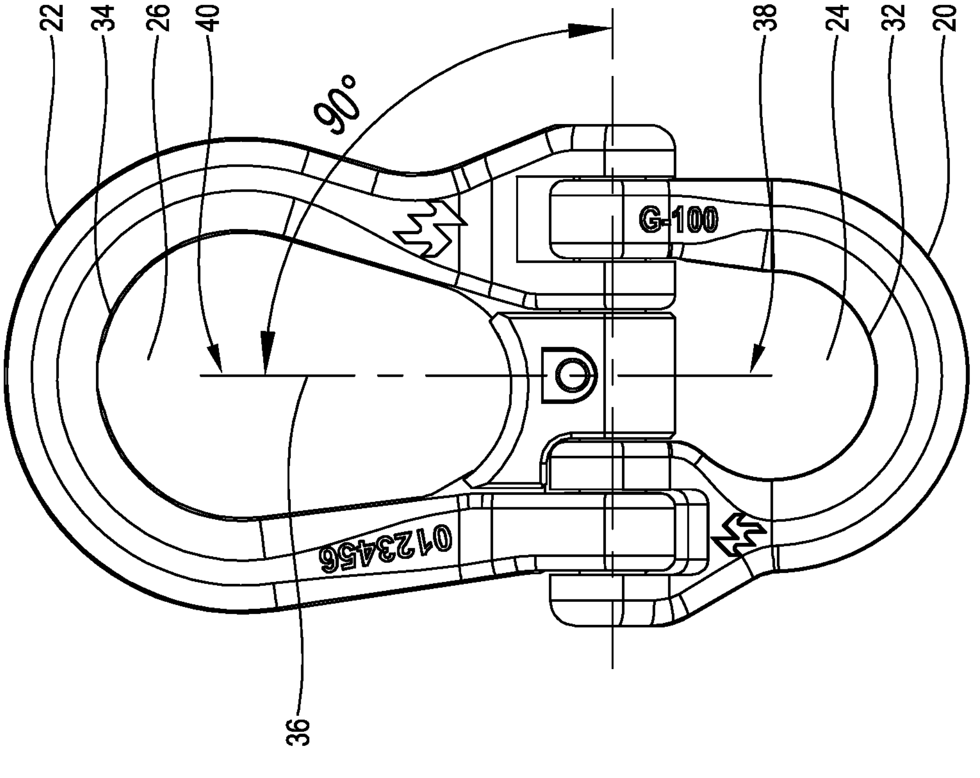
FIG. 14 shows a front view of a coupler of the articulated clutch, depicting an axis of rotation of the second part relative to the first part with respect to a central line of the coupler connecting a centre of a circular arc of the first part with a centre of a circular arc of the second part.
Figure 15:
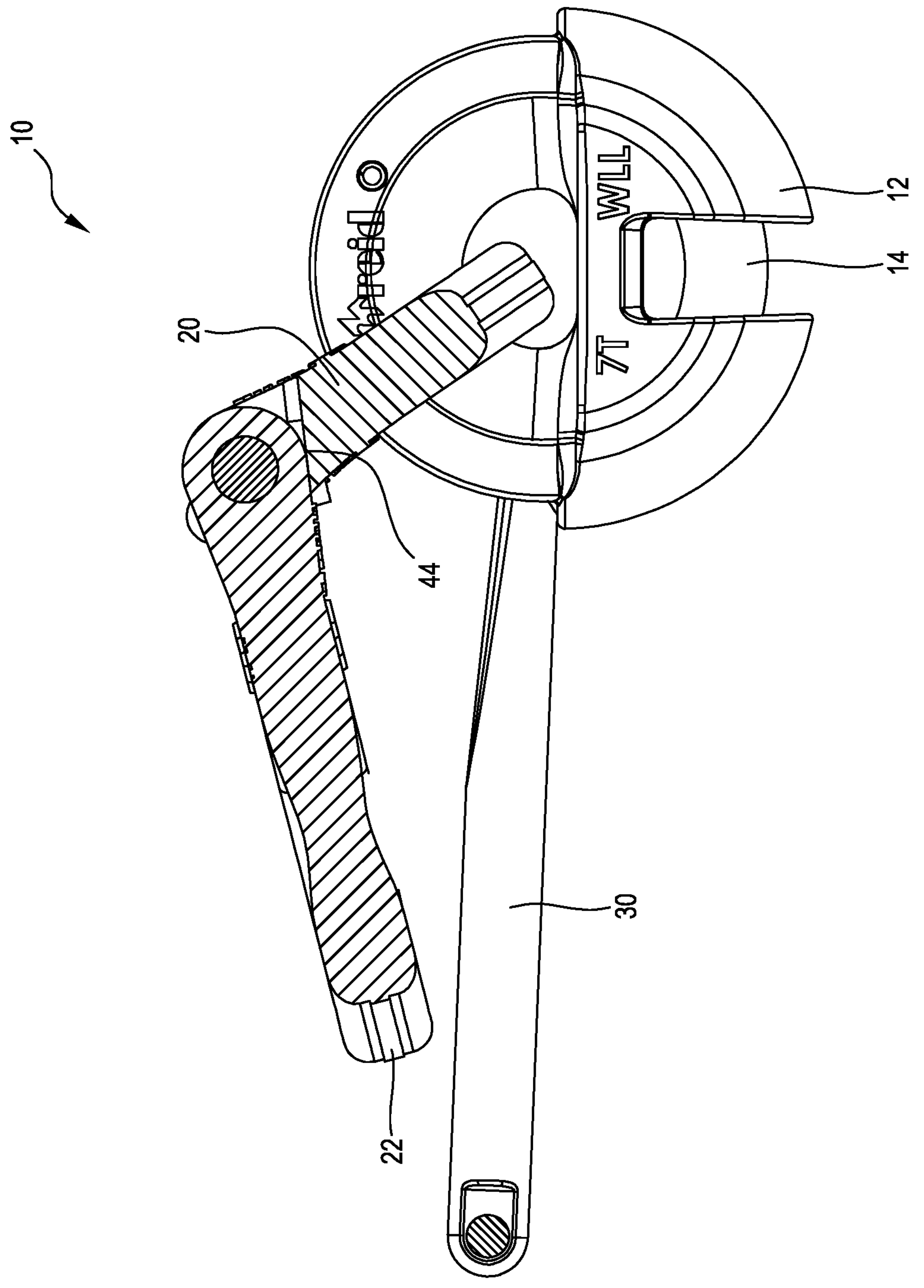
FIG. 15 shows a side view of an articulated clutch in accordance with another example, depicting the limit of rotation of the coupler relative to the toroidal connector.
Figure 16:
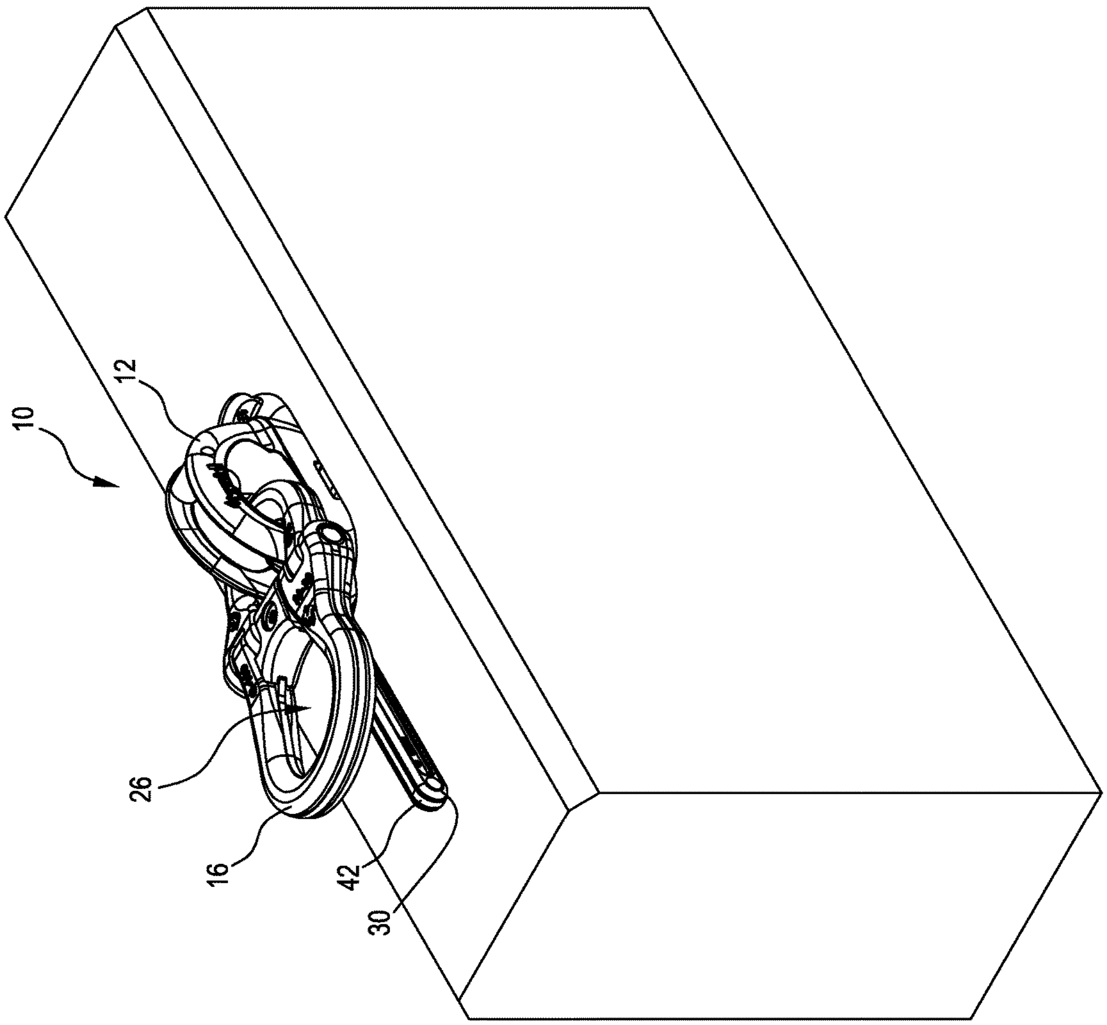
FIG. 16 shows a perspective view an articulated clutch in accordance with another example, depicting a locking ring handle being sufficiently long to limit rotation of the coupler relative to the toroidal connector.
Figure 17:
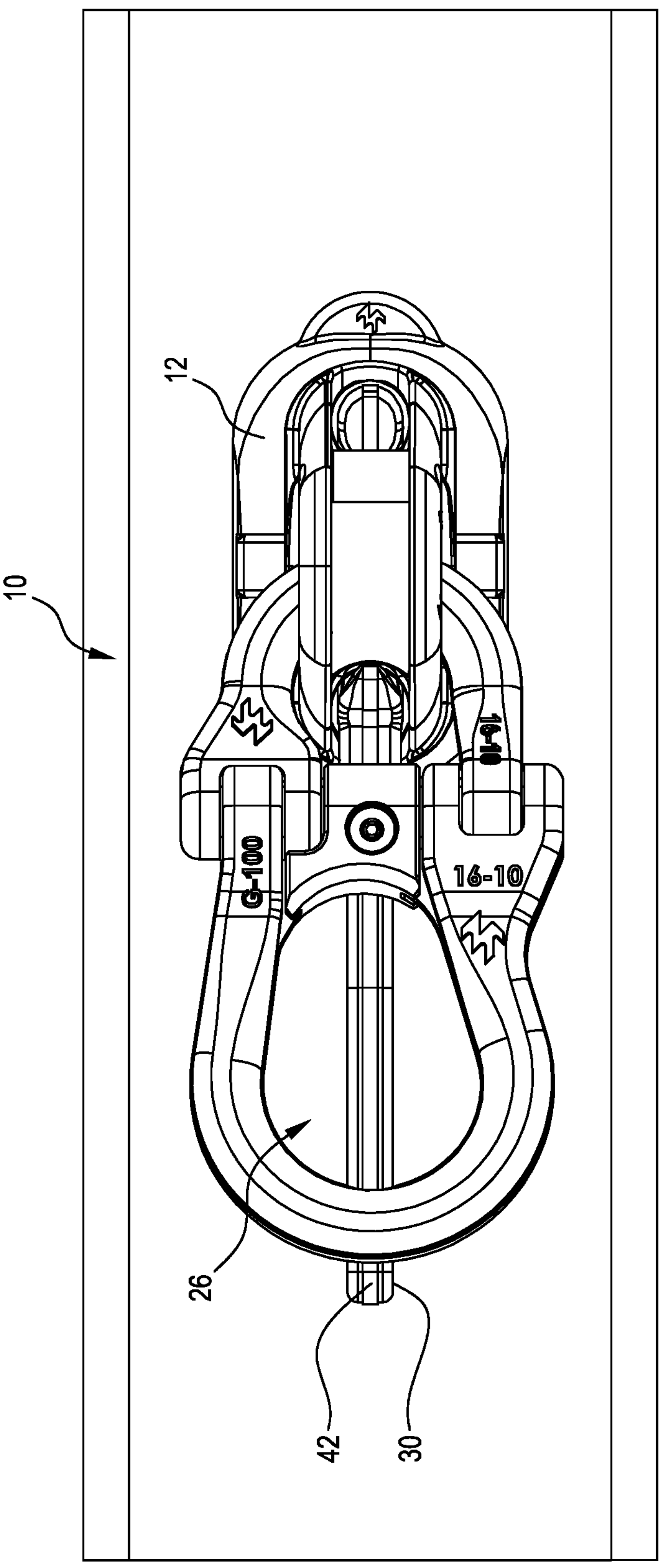
FIG. 17 shows a top view of the articulated clutch shown in FIG. 16.
Figure 18:
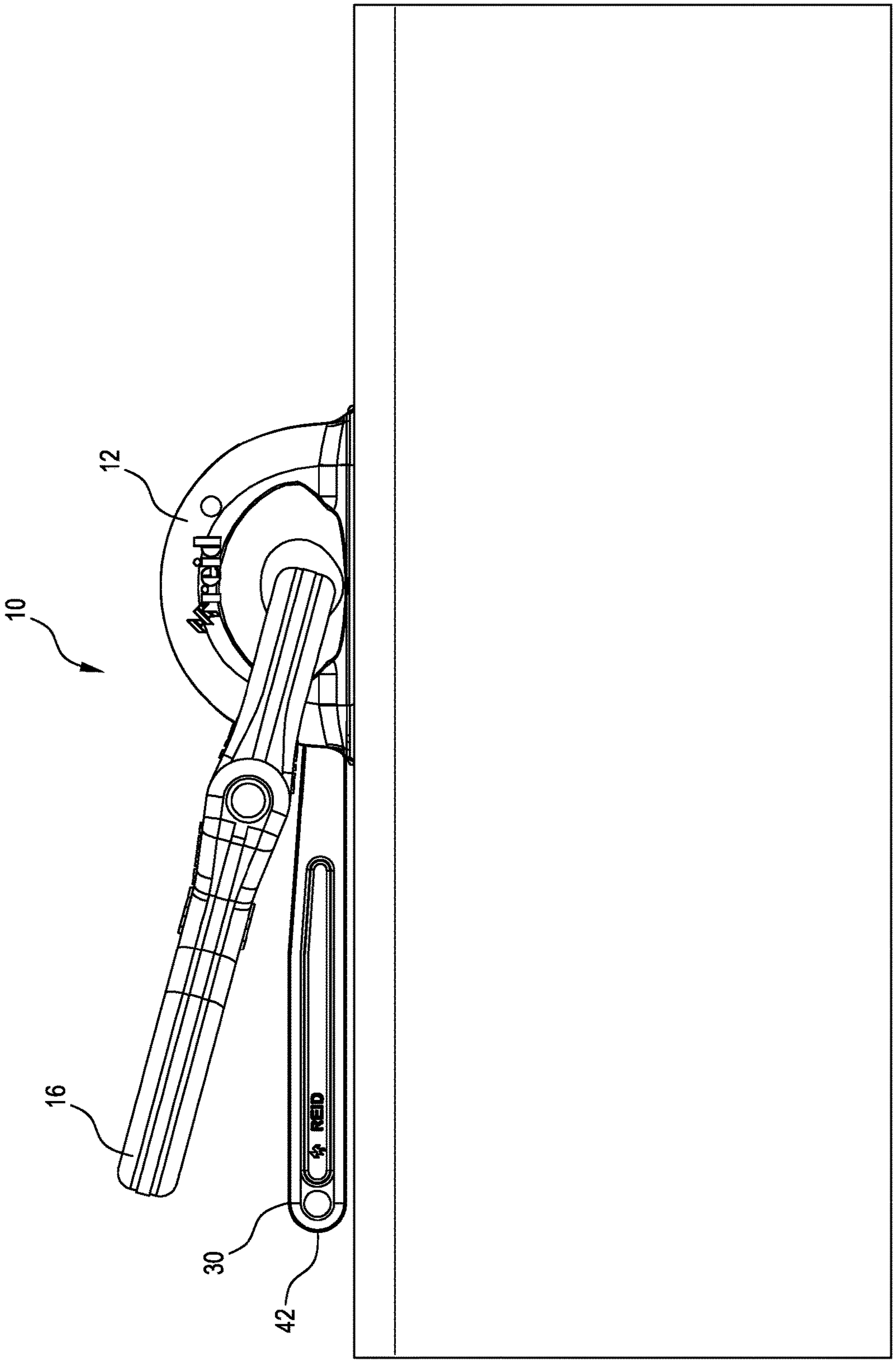
FIG. 18 shows a side view of the articulated clutch shown in FIG. 16.

As shown most clearly in FIG. 14, the first part 20 has a first circular arc 32 and the second part 22 has a second circular arc 34. The pin 28 is located such that a longitudinal axis of the pin 28 is perpendicular to a line 36 connecting a centre 38 of the first arc 32 to a centre 40 of the second arc 34.

Accordingly, the axle pin 28 runs perpendicular to the centre line between the arcs of the two loops 24, 26. This allows the handle (coupler 16) to be symmetrical such that when rotated about the toroidal connector 12, the coupler 16 has the same angular movement either way. This perpendicular configuration may also assist in the articulation of the coupler 16 when it needs to be bent around the end of a concrete panel being lifted.

Figure 8:
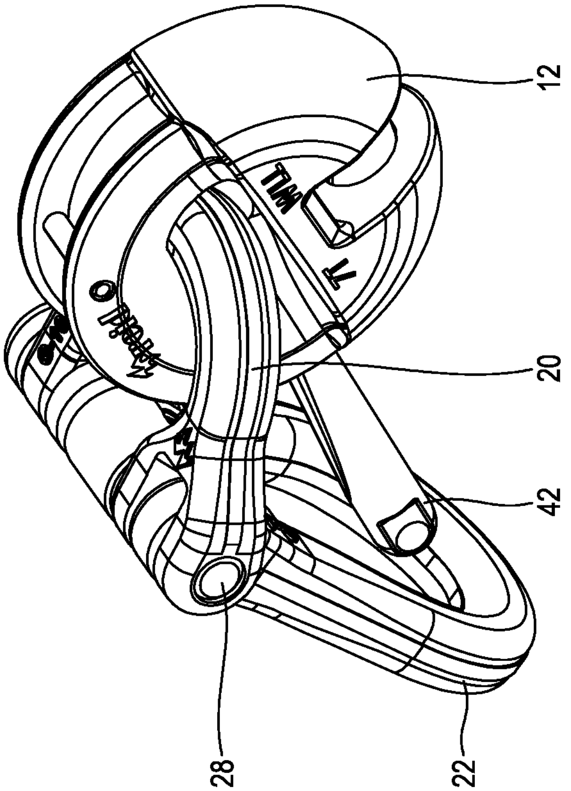
FIG. 8 shows a perspective view of the articulated clutch, depicting a limit of rotation of a second part of a coupler relative to a first part of the coupler.
Figure 7:
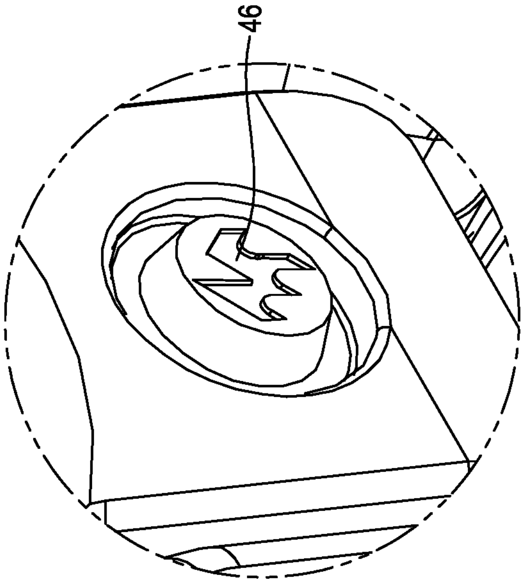
FIG. 7 is a detailed perspective view of an end of the tamper evident device when in situ.
Figure 9B:
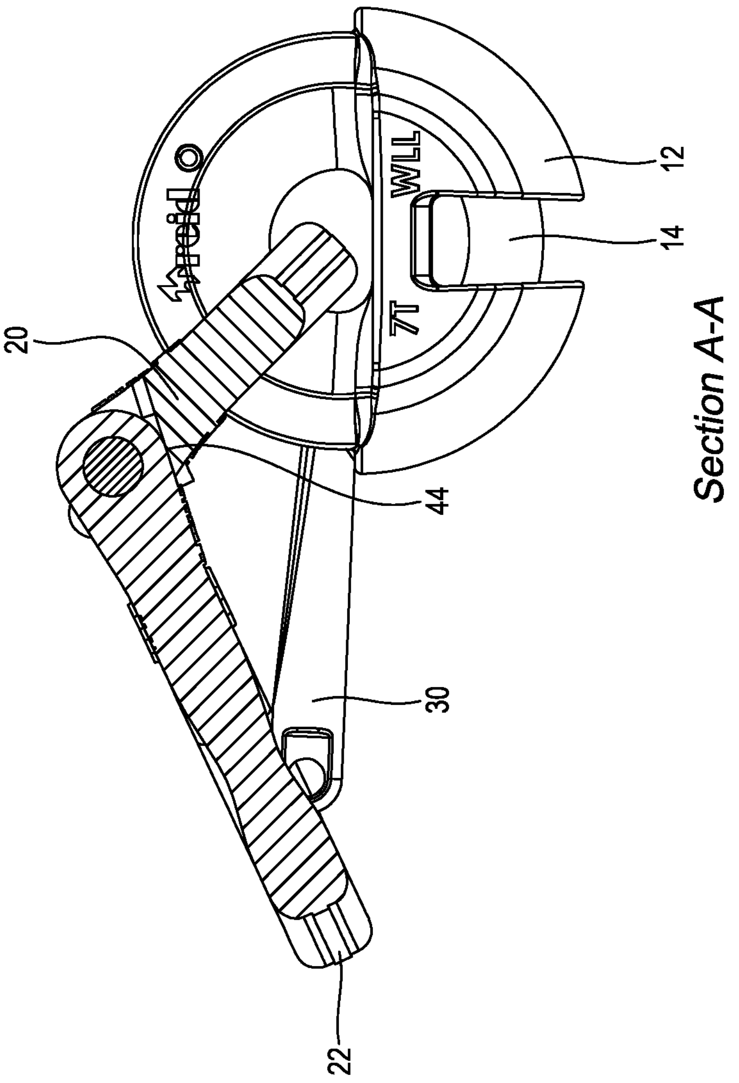
FIG. 9*b* shows a cross-sectional view of the articulated clutch taken along line A-A shown in FIG. 9*a;*
Figure 9A:
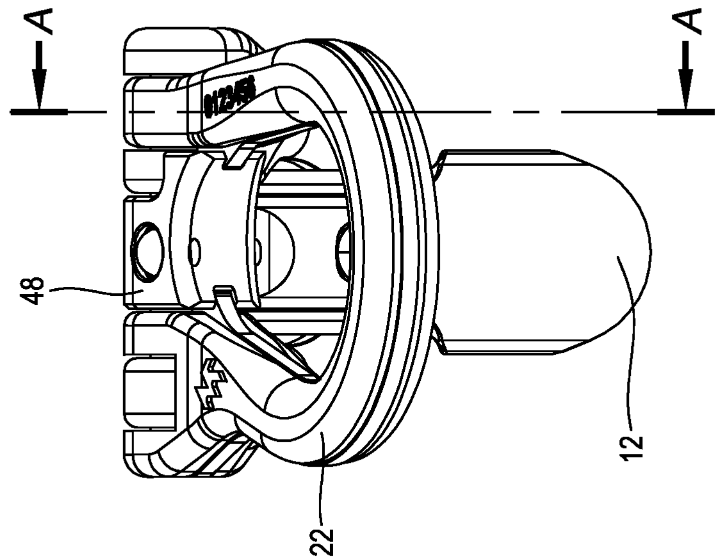
FIG. 9*a* shows a front view of the articulated clutch, depicting the limit of rotation of the second part relative to the first part.
Figure 10:
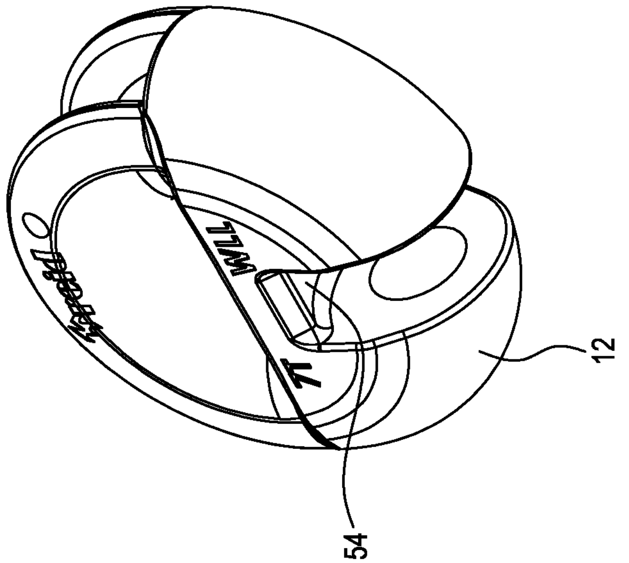
FIG. 10 shows a side perspective view of a toroidal connector of the articulated clutch.
Figure 9C:
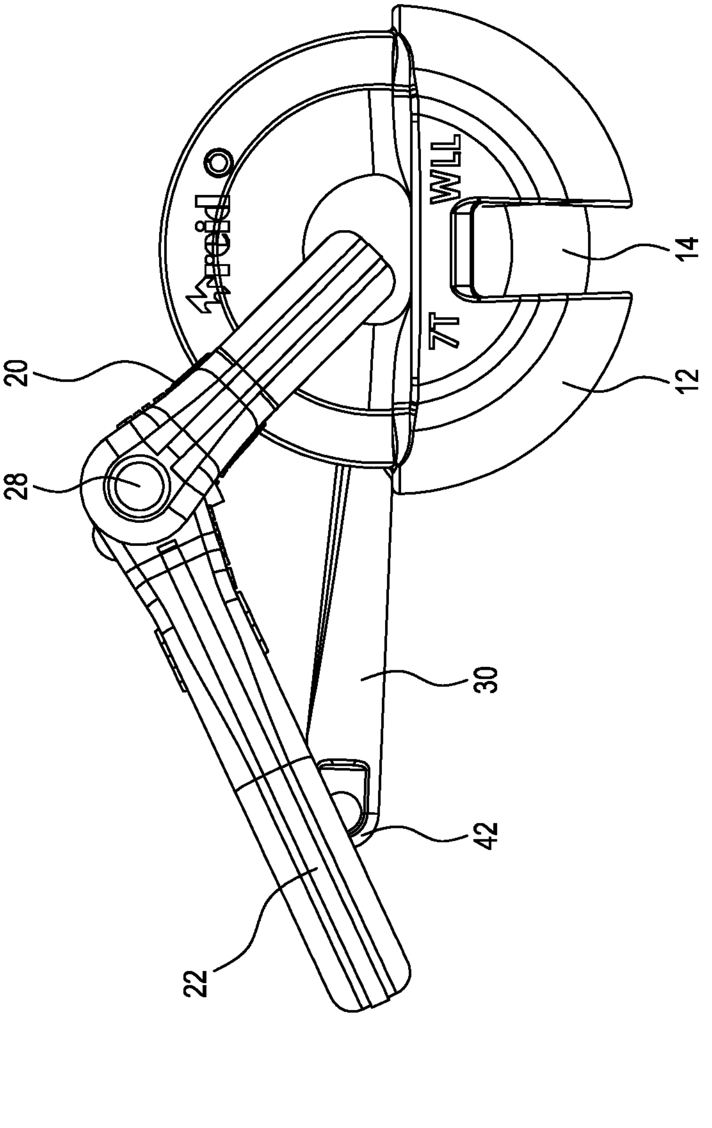
FIG. 9*c* shows a side view of the articulated clutch, depicting the limit of rotation of the second part relative to the first part.
Figure 11B:
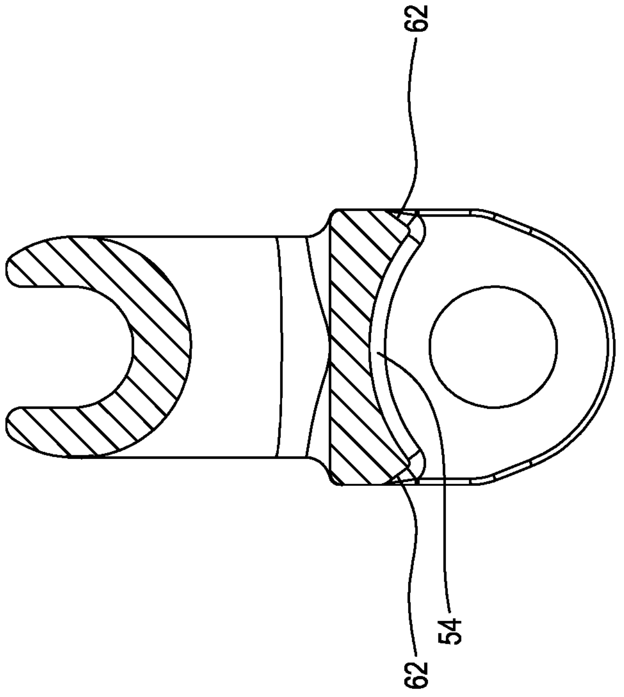
FIG. 11*b* shows a side cross-sectional view of the toroidal connector taken along line A-A shown in FIG. 11*a;*
Figure 11A:
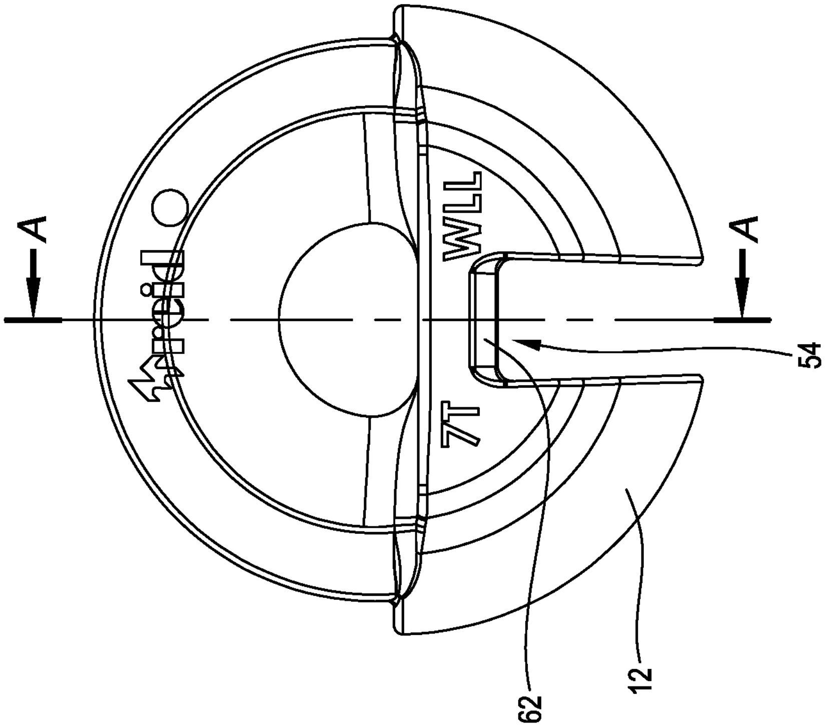
FIG. 11*a* shows a front view of the toroidal connector.

Turning to FIGS. 8 to 9*c*, the latch 14 in the form of the locking ring may have a handle 30 extending generally radially outwardly from the toroidal connector 12. The coupler 16 may be specifically arranged to limit pivotal movement of the second part 22 relative to the first part 20. In other words, in FIG. 2 the first part 20 and the second part 22 are shown in a co-planar configuration, whereas in FIGS. 8 to 9*c* there is shown a limit of pivotal movement of the second part 22 relative to the first part 20.

In one form, the coupler 16 may be arranged to limit pivotal movement of the second part 22 relative to the first part 20 in one direction. The coupler 16 may also be arranged to limit pivotal movement of the second part 22 relative to the first part 20 such that the limit prevents a tip 42 of the locking ring handle passing through an inner loop 26 of the second part 22.

As best shown in the cross-sectional drawing shown in FIG. 9B, the first part may include a shoulder 44 arranged to bear against the second part 22 at the limit. Alternatively, or in addition, the second part 22 may include a shoulder arranged to bear against the first part 20 at the limit.

In a preferred example, the coupler 16 is arranged to limit pivotal movement of the second part 22 relative to the first part 20 such that the limit prevents the second part 22 from engaging with the locking ring handle 30 to rotate the locking ring handle 30. More specifically, the coupler 16 may be arranged to limit pivotal movement of the second part 22 relative to the first part 20 such that the limit prevents the second part 22 from engaging with the locking ring handle 30 to rotate the locking ring handle 30 from the engaged condition to the disengaged condition.

In this way, the two loops 24, 26 are limited in rotation in one direction to eliminate the large loop being able to hook under the locking ring handle 30. The applicant has identified that, where the upper loop (secondly 26) is large enough to accept a lifting hook, then that loop has the potential to cook under the locking ring handle 30 and could allow the clutch 10 to become disconnected from the anchor unintentionally. Advantageously, by limiting rotation in this way examples of the present disclosure are able to prevent unintentional disconnection.

As shown in FIGS. 4 to 7, the second part 22 is pivotal relative to the first part 20 about the axle pin 28. The coupler 16 may also include a tamper evident indicator 46 to indicate that the clutch 10 has not been disassembled. The tamper evident indicator may be is arranged to indicate that the axle pin 28 has not been removed from the coupler 16. In the example shown, the coupler 16 is provided with a bush 48 around a central portion of the axle pin 28, the central portion being between the distal end of the first part 20 and the second part 22. The second part 22 may be provided with longitudinal slots which are received in corresponding longitudinal grooves of the bush 48 to keep the bush 48 aligned relative to the second part 22 and to prevent rotation of the bush 48 relative to the second part 22.

Figure 6:
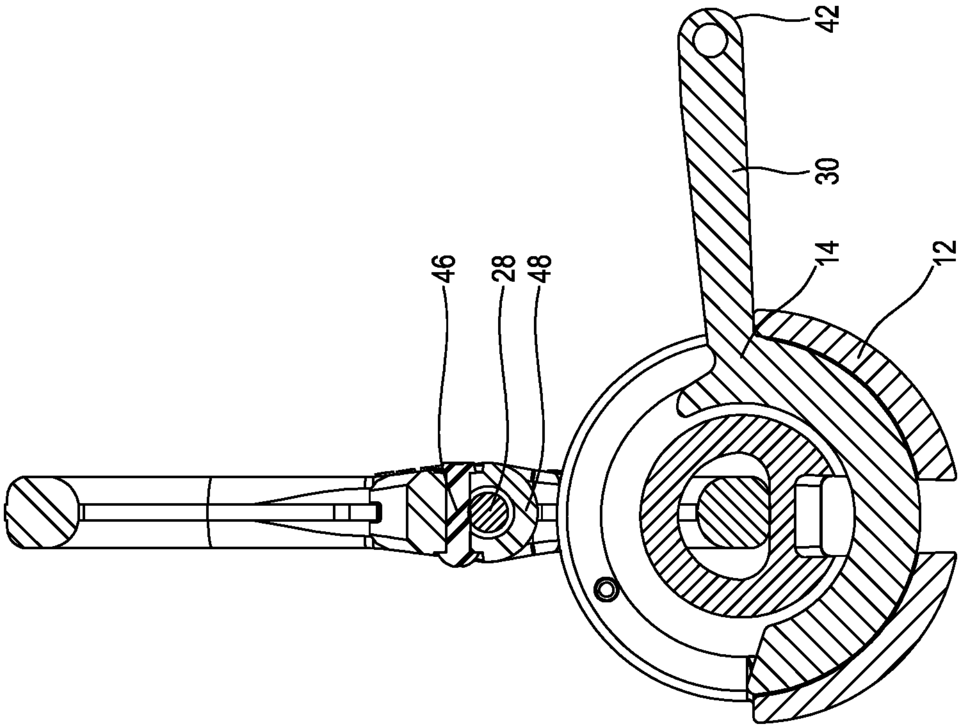
FIG. 6 shows a side cross-sectional view of the articulated clutch, depicting location of the tamper evident device when in situ.

With reference to FIG. 4, the pin 28 may have a circular groove 50 about its circumference and the tamper evident indicator 46 may include a member in engagement with the circular groove 50 to prevent movement of the pin 28 along its longitudinal axis relative to the bush 48. In addition, the toroidal connector 12 may be provided with a stop pin 52 to limit rotation of the latch 14 relative to the toroidal connector 12. The member 46 may be anchored to the bush 48. With reference to FIG. 6, the member 46 may be in the form of a rivet which passes through the bush 48 and has a flange at each end to retain the rivet relative to the bush 48. Alternatively, the member may be in the form of a roll pin.

In this way, there is provided a tamper evident centre bush 48. The bush 48 may be profiled to match the loops 24, 26, the bush 48 being secured by either a rivet or a roll pin that does not pass through the middle of the axle pin 28 but passes tangentially through the groove 50 on the axle pin 28. If secured by a rivet, the rivet will be deformed to secure it and the deformed end may have a branded logo (see FIG. 5 and FIG. 7) to indicate the handle (coupler 16) has not been tampered with. If a roll pin is used, then a seal (possibly in the form of epoxy or solder) may be used to indicate the clutch 10 has not been disassembled.

As will be appreciated from the drawings, the bush 48 has a non-cylindrical shape. The locking pin or rivet 46 runs tangentially through the groove 50 in the axle pin 28. Accordingly, this provides an indication to the user that the clutch 10 has not been tampered with since proof testing. The applicant has identified that a commercial hammerlock can be disassembled and reassembled without it being evident that this has happened. Therefore, the original proof testing and certification could be invalid as this must be conducted anytime the clutch is modified.

Advantageously, the incorporation of a tamper evident feature gives the user confidence that the clutch 10 has not been tampered with since proof testing. The unique shape of the bush 48 allows the rivet or cross pin 46 to hold the axle 28 by the groove 50 rather than passing the centre of the axle 28. This creates far less stress concentration, making the axle 28 stronger. The unique shape of the bush 48 also allows the use of the tamper evident rivet 46. The tangentially positioned groove 50 allows for easier assembly of the system compared to that of a centrally located hole as less alignment is required (that is, alignment is only required in the x-axis and not in both x and y axes).

Turning now to FIGS. 10 to 13, the toroidal connector 12 may be provided with a circular seat 54 for sitting upon a circular upper surface 56 of a head 58 of an anchor 60 coupled to the toroidal connector 12. The circular seat 54 terminates in a radial bearing surface 62 for face-to-face abutment with a castellation 64 of the anchor 60.

Figure 13:
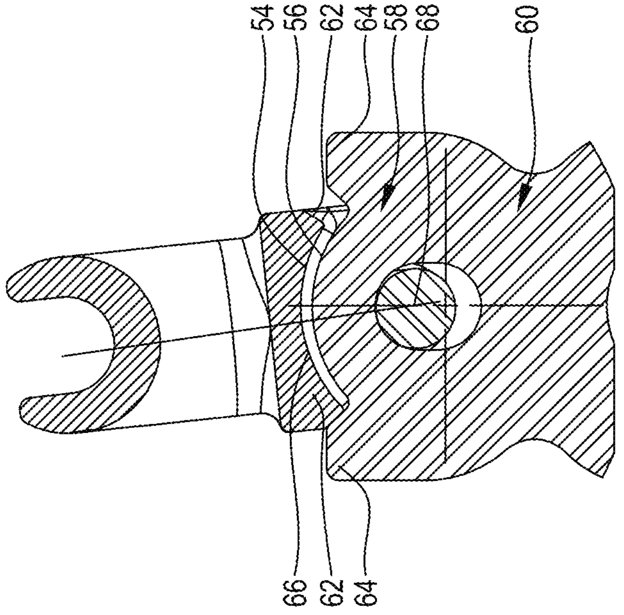
FIG. 13 shows a cross-sectional view of the toroidal connector when connected to a head of a cast-in anchor, taken through a central plane of the toroidal connector.
Figure 12:
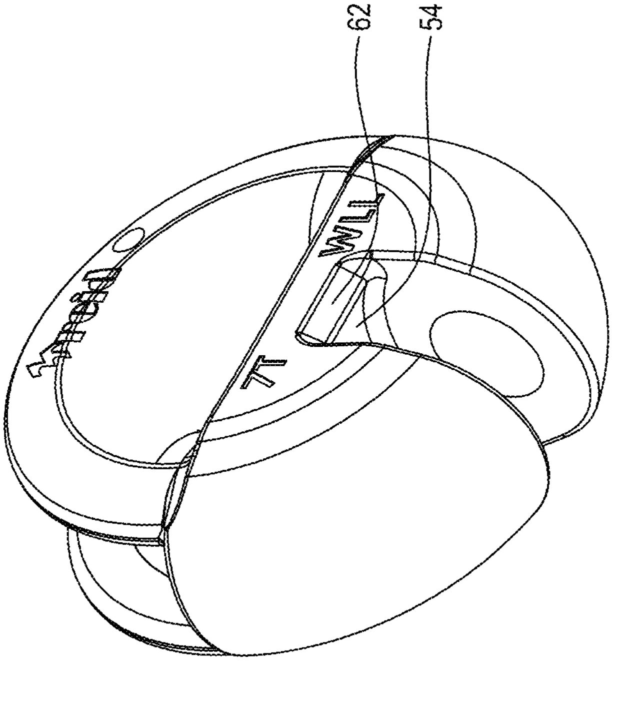
FIG. 12 shows an opposite side perspective view of the toroidal connector.

As can be seen most clearly in FIG. 13, the circular seat 54 has a first radial bearing surface 62 for abutment with a first castellation 64 of the anchor and a second, opposite, radial bearing surface 62 for abutment with a second castellation 64 of the anchor 60.

In the example shown, the circular seat 54 is circular about an arc 66 having a centre at a central longitudinal (tangential) axis 68 of the latch 14. More specifically, the radial bearing surface 62 is radial relative to a circle having a centre at the central longitudinal axis 68 of the latch 14.

Advantageously, the provision of the radial bearing surfaces 62 improve the interface of the toroidal connector 12 and the anchor 60, when compared with existing connectors which abut at an edge or point. The applicant has identified that the face-to-face bearing provides less pressure owing to the greater surface area of contact, reducing wear on the toroidal connector 12. In particular, the applicant has identified that previous clutch designs for castellated anchors would see the sides of the torus bear on the castellations (or in a point or line contact where the sides of the torus meet the curved cut out). In the example of the present disclosure shown, a new angled face interacts with the angled face of the anchor 60 to achieve a far greater bearing area resulting in less wear on the torus over time. This is achieved by way of the angled faces on the toroidal connector 12 which bear against the castellations 64 on the head 58 of the anchor 60. This is in contrast to existing arrangements where a toroidal connector bears on flat faces of the anchor or, where the anchor is castellated, the sides of the torus bear on the castellations.

With reference to FIGS. 15 to 18, there is shown an alternative example of the present disclosure in which the locking ring handle 30 is arranged to abut the coupler 16 to limit rotational movement of the coupler 16 relative to the toroidal connector 12. In particular, the locking ring handle 30 is arranged to limit rotational movement of the coupler 16 relative to the toroidal connector 12 such that the limit prevents a tip 42 of the locking ring handle 30 passing through an inner loop 26 of the coupler 16. This may be achieved by dimensioning the locking ring handle 30 such that the tip 42 of the locking ring handle 30 extends radially further from a centre of the toroidal connector 12 than an outermost edge of the coupler 16.

Figure 19:
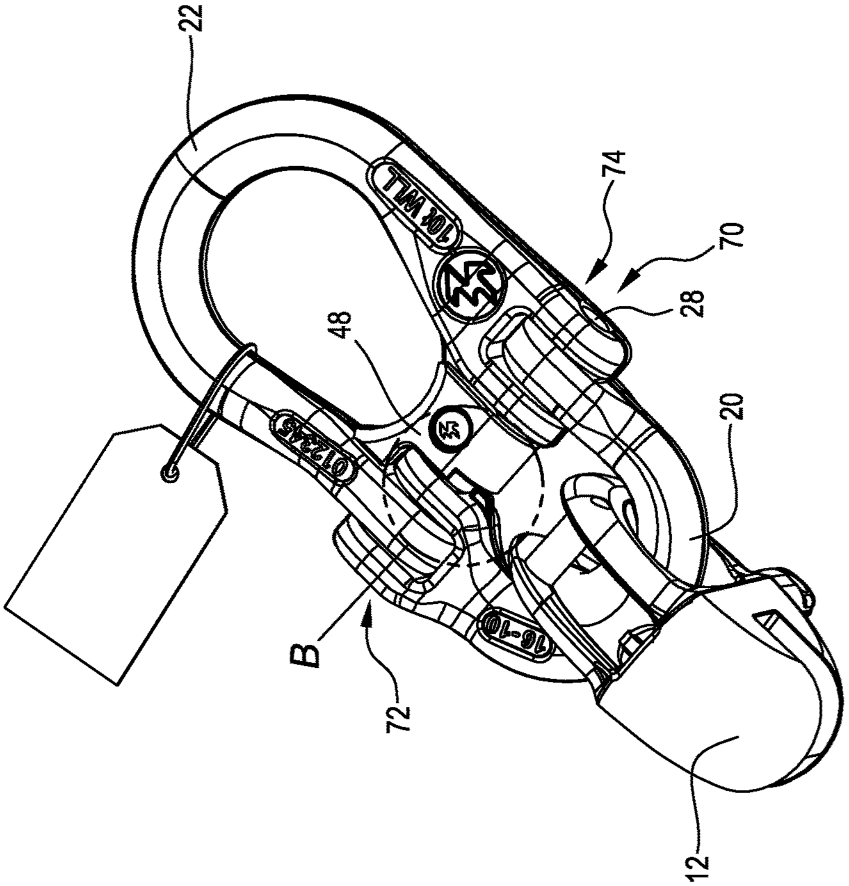
FIG. 19 shows a perspective view of the articulated clutch in accordance with another example.

Turning to FIGS. 19 to 22, there is shown an example of the present disclosure in which the coupler 16 is arranged to limit pivotal movement of the second part 22 relative to the first part 20 in two directions. More specifically, as can be seen in FIG. 19, the first part 20 is connected to the second part 22 by a pivotal coupling 70. In the example shown, the pivotal coupling 70 includes a first hinge 72 at one side of the coupler 16 and a second hinge 74 at an opposite side of the coupler 16. As can be seen, the first hinge 72 and the second hinge 74 are arranged to provide pivotal movement of the second part 22 relative to the first part 21 along a common axis which may be ensured by a single axle pin 28.

In the example shown in FIGS. 19 to 22, the pivotal coupling 70 includes a bush 48 between the first hinge 72 and the second hinge 74. The bush 48 includes a stop 76 for abutting against the first part 20 or the second part 22 to limit rotation of the second part 22 relative to the first part 20. The bush 48 may be arranged to rotate with the second part 22 (for example, engaged with the second part 22 by way of a tongue and groove connection) and the stop 76 may be adapted to abut against the first part 20 to limit rotation of the second part 22 relative to the first part 20.

Figure 20:
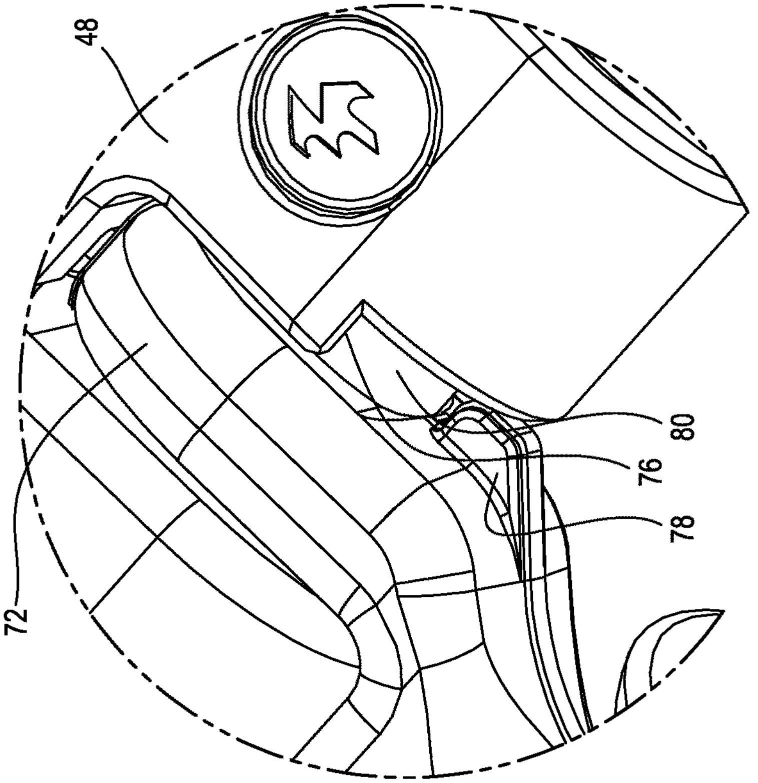
FIG. 20 shows a detailed view of portion labeled “B” in FIG. 19.

FIG. 20 shows an enlarged and detailed view of the portion labeled "B" in FIG. 19. In FIG. 20 it can be seen that the first part 20 is provided with a tab 78 for abutment with the stop 76.

Figure 21:
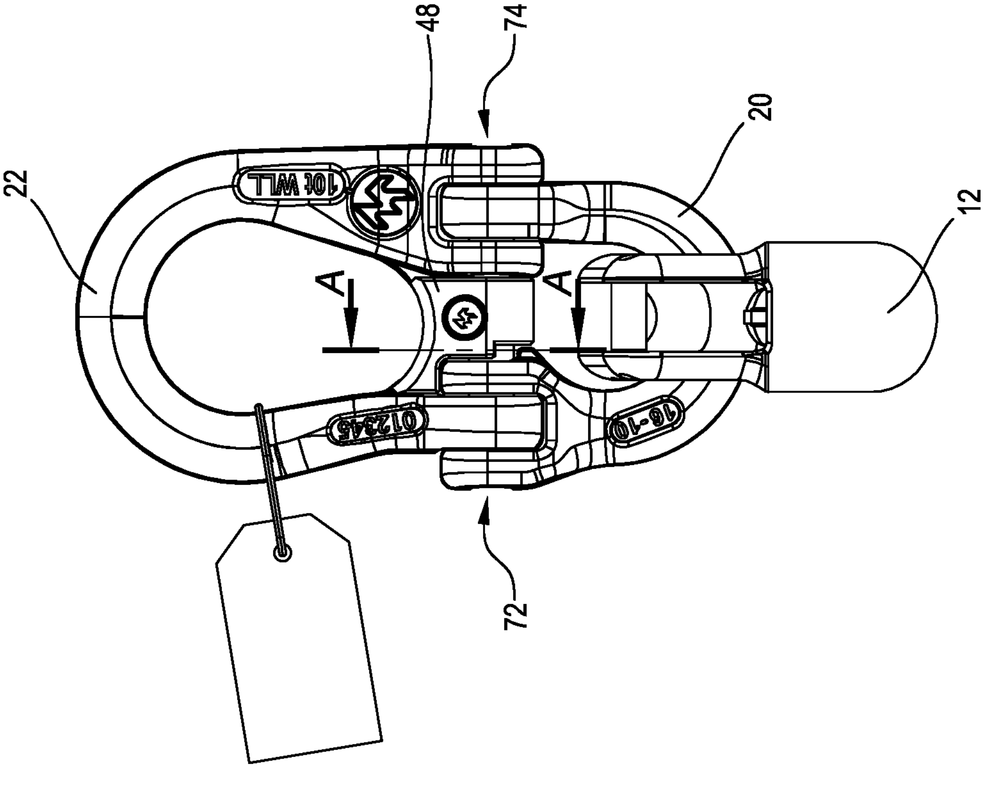
FIG. 21 shows a front view of the articulated clutch shown in FIG. 19 and FIG. 20.
Figure 22:
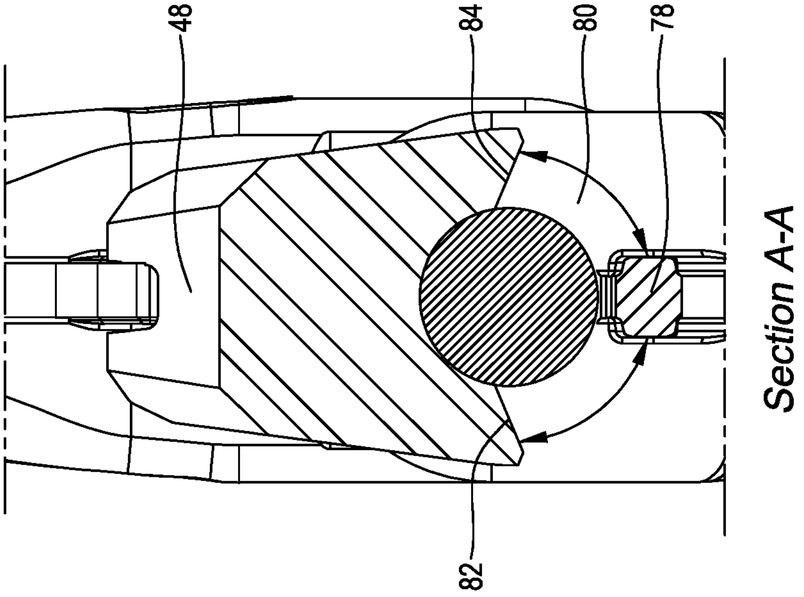
FIG. 22 shows a detailed view of section A-A shown in FIG. 21.

FIG. 21 shows a front view of the coupler 16, and FIG. 22 shows an enlarged and detailed view of the cross-section labeled A-A in FIG. 21. With reference to FIG. 22, the stop 76 may be in the form of a cutout 80 having two stop surfaces, comprising a first stop surface 82 for abutting one side of the tab 78 and a second stop surface 84 for abutting an opposite side of the tab for limiting rotation of the second part 22 relative to the first part 20 in two directions.

Advantageously, this arrangement enables the limiting of angular movement of the second part 22 relative to the first part 20 in two directions and avoids a weakness which may otherwise be incurred if the limiting mechanism is attempted to be achieved within the first hinge 72 and/or the second hinge 74. The arrangement shown in FIGS. 19 to 22 takes advantage of there being no load or only little load on the coupler 16 when the rotation limiting mechanism is required to perform its duty. In other words, the arrangement shown in FIGS. 19 to 22 changes how rotation of the upper loop relative to the lower loop is achieved. In this revised version, this limitation of rotation is achieved between radial shoulders in the centre bush 48 that limit the movement of a lug or tab on the inside of the lower loop.

The revised arrangement limits rotation in both directions, not just one direction. It will be understood by those skilled in the art that the two directions may be different (for example, in magnitude of limitation), thereby preventing the large loop—the second part—from interacting with the locking ring handle while allowing extra rotation in the opposite direction. This revised arrangement works between the lower loop—the first part 20—and the centre bush 48, where the centre bush 48 is keyed to the upper bush to maintain alignment with the upper loop.

While various embodiments of the present disclosure have been described above, it should be understood that they have been presented by way of example only, and not by way of limitation. It will be apparent to a person skilled in the relevant art that various changes in form and detail can be made therein without departing from the spirit and scope of the present disclosure. Thus, the present disclosure should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

LIST OF FEATURES

10 Clutch
12 Toroidal connector
14 Latch
16 Coupler
18 Lifting apparatus
20 First part
22 Second part
24 First loop
26 Second loop
28 Axle pin
30 Handle of the latch
32 First circular arc
34 Second circular arc
36 Line
38 Centre of the first arc
40 Centre of the second arc
42 Tip of the locking ring handle
44 Shoulder
46 Tamper evident indicator
48 Bush
50 Circular groove
52 Stop pin
54 Circular seat
56 Circular upper surface
58 Head
60 Anchor
62 Radial bearing surface
64 Castellation
66 Arc
68 Central longitudinal axis of the latch
70 Pivotal coupling
72 First hinge
74 Second hinge
76 Stop
78 Tab
80 Cutout
82 First stop surface
84 Second stop surface

The invention claimed is:

1. A clutch for lifting a concrete component, the clutch comprising:
a toroidal connector;
a latch movable relative to the toroidal connector from a disengaged condition to an engaged condition, wherein the latch includes a handle including a tip extending radially outwardly from the toroidal connector; and
a coupler configured to couple the toroidal connector to a lifting apparatus, wherein the coupler is articulated,
wherein the coupler includes a first part and a second part pivotal relative to the first part, the first part including a first loop engaged through the toroidal connector and the second part including a second loop configured to receive the lifting apparatus, and
wherein the handle is arranged to abut the coupler to limit rotational movement of the coupler relative to the toroidal connector such that the tip of the handle is prevented from passing through the second loop of the coupler.

2. The clutch of claim 1, wherein the first loop is a different size to the second loop.

3. The clutch of claim 2, wherein the first loop is smaller than the second loop.

4. The clutch of claim 1, wherein the second loop is configured to enable direct fitment of a lifting chain while also enabling direct fitment of a lifting hook.

5. The clutch of claim 1, wherein the coupler includes an elongated pin extending about a longitudinal axis of which the second part is pivotal relative to the first part.

6. The clutch of claim 1, wherein the latch is a circular latch passing through an inner circular passage of the toroidal connector.

7. A clutch for lifting a concrete component, the clutch comprising:
a toroidal connector;
a latch movable relative to the toroidal connector from a disengaged condition to an engaged condition, wherein the latch includes a handle including a tip extending radially outwardly from the toroidal connector; and
a coupler configured to couple the toroidal connector to a lifting apparatus, wherein the coupler includes a first part and a second part pivotal relative to the first part about a pin, the first part including a first circular arc engaged through the toroidal connector and the second part including a second circular arc configured to receive the lifting apparatus, and wherein the pin is located such that a longitudinal axis of the pin is perpendicular to a line connecting a center of the first arc to a center of the second arc,
wherein the handle is arranged to abut the coupler to limit rotational movement of the coupler relative to the toroidal connector such that the tip of the handle is prevented from engaging the second part of the coupler.

8. The clutch of claim 1, wherein the tip of the handle extends radially further from a center of the toroidal connector than an outermost edge of the coupler.

9. The clutch of claim 8, wherein the tip of the handle extends beyond the coupler such that the tip of the handle is prevented from passing through the second loop of the coupler and the second part is prevented from engaging with the handle to rotate the handle from the engaged condition to the disengaged condition.

10. The clutch of claim 1, wherein:

the handle is arranged to abut the coupler to limit the rotational movement of the first part of the coupler relative to the toroidal connector in a first direction; and the second part is articulatable about the first part in the first direction when the handle abuts the coupler to limit the rotational movement of the coupler relative to the toroidal connector in the first direction.

11. The clutch of claim 1, wherein:

the coupler includes a first hinge at one side of the coupler, a second hinge at an opposite side of the coupler, and a bush between the first hinge and the second hinge;

the first hinge and the second hinge are configured to provide pivotal movement along a common axis; and the handle is arranged to abut the second hinge of the coupler to limit the rotational movement of the coupler relative to the toroidal connector.

12. The clutch of claim 11, wherein the bush includes a stop for abutting against one of the first part and the second part to limit rotation of the second part relative to the first part.

13. The clutch of claim 7, wherein the tip of the handle extends radially further from a center of the toroidal connector than an outermost edge of the coupler.

14. The clutch of claim 13, wherein the tip of the handle extends beyond the coupler such that the tip of the handle is prevented from passing through the second circular arc of the coupler and the second part is prevented from engaging with the handle to rotate the handle from the engaged condition to the disengaged condition.

15. The clutch of claim 7, wherein:

the handle is arranged to abut the coupler to limit the rotational movement of the first part of the coupler relative to the toroidal connector in a first direction; and the second part is articulatable about the first part in the first direction when the handle abuts the coupler to limit the rotational movement of the coupler relative to the toroidal connector in the first direction.

16. The clutch of claim 15, wherein:

the coupler includes a first hinge at one side of the coupler, a second hinge at an opposite side of the coupler, and a bush between the first hinge and the second hinge;

the first hinge and the second hinge are pivotal about the pin; and the handle is arranged to abut the second hinge of the coupler to limit the rotational movement of the coupler relative to the toroidal connector.

17. The clutch of claim 16, wherein the bush includes a stop for abutting against one of the first part and the second part to limit rotation of the second part relative to the first part.

18. The clutch of claim 16, wherein one of the first part and the second part includes a shoulder arranged to abut the other of the first part and the second part to limit rotation of the second part relative to the first part.

19. The clutch of claim 7, wherein the handle is arranged to abut the coupler to limit the rotational movement of the coupler relative to the toroidal connector in a first direction.

* * * * *